Figure 1:
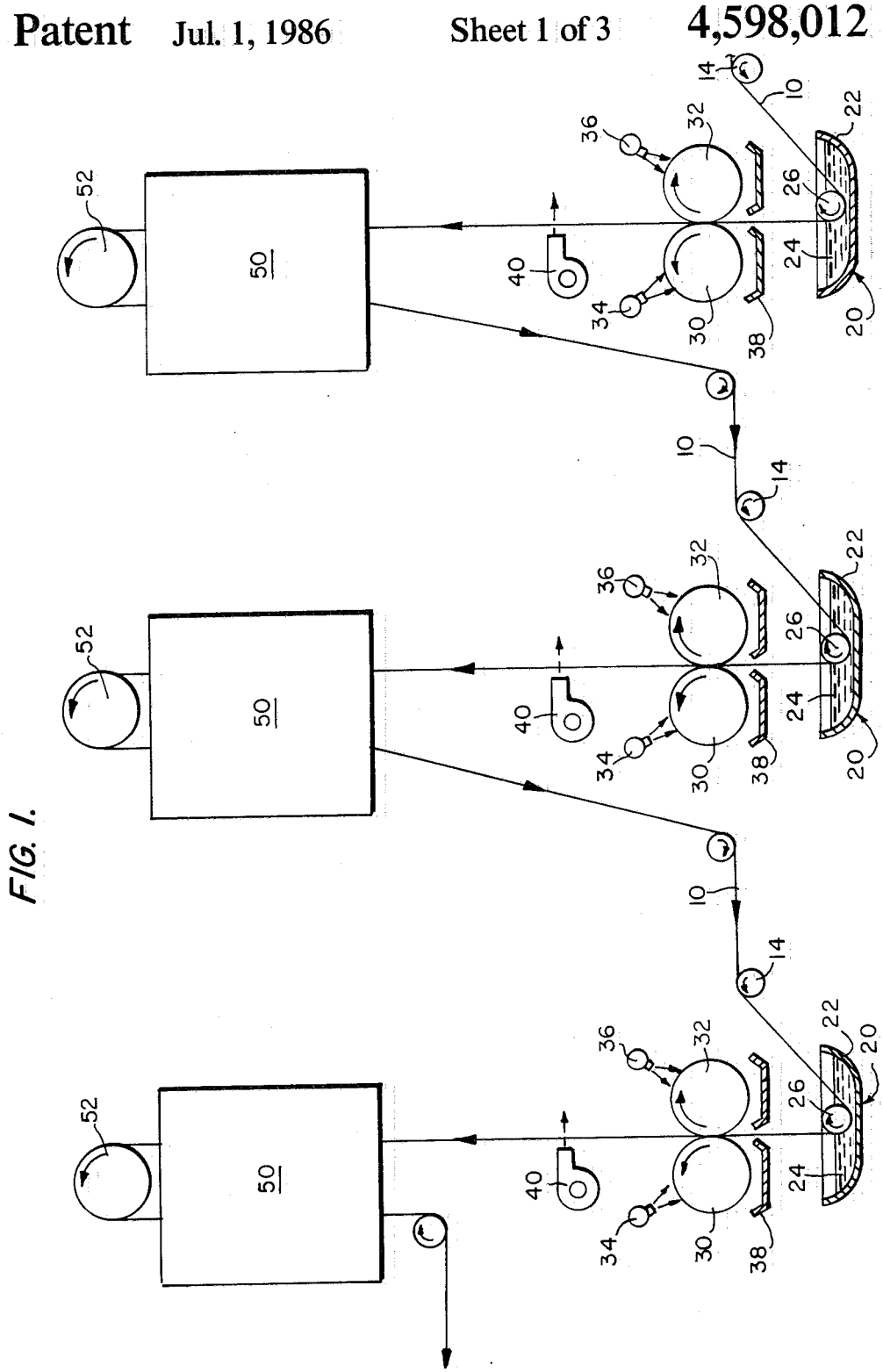

United States Patent [19]

Miller et al.

[11] Patent Number: 4,598,012

[45] Date of Patent: Jul. 1, 1986

[54] GLASS FIBER REINFORCED CEMENTITIOUS PRODUCTS

[75] Inventors: Richard S. Miller, Crofton; Randall P. Bright, Bowie, both of Md.; Richard D. Vargo, Akron, Ohio; Patricia M. Dreyfuss, Midland, Mich.

[73] Assignee: Research One Limited Partnership, Towson, Md.

[21] Appl. No.: 701,747

[22] Filed: Feb. 14, 1985

[51] Int. Cl.[4] .................... B32B 17/02; B05D 3/02
[52] U.S. Cl. .................... 428/228; 427/348; 427/352; 427/359; 427/389.8; 427/430.1; 427/434.6; 427/434.7; 427/407.3; 428/246; 428/250; 428/251; 428/252; 428/268; 428/273
[58] Field of Search .............. 427/389.8, 407.3, 359, 427/348, 352, 430.1, 434.6, 434.7; 118/104, 111, 114, 117; 428/228, 246, 250, 251, 252, 268, 273

[56] References Cited

U.S. PATENT DOCUMENTS

| | | | |
|---|---|---|---|
| 2,717,217 | 9/1955 | Sullivan | 427/407.3 X |
| 2,722,489 | 11/1955 | Hennessey et al. | 427/407.3 X |
| 3,556,844 | 1/1971 | Marzocchi | 427/407.3 X |
| 3,684,470 | 8/1972 | Marzocchi | 427/407.3 X |
| 3,952,119 | 4/1976 | Bühler | 427/428 X |
| 4,242,380 | 12/1980 | Courtoy | 427/428 X |

FOREIGN PATENT DOCUMENTS 1299941 12/1972 United Kingdom ............ 427/407.3

Primary Examiner—Thurman K. Page
Attorney, Agent, or Firm—Lawrence I. Field

[57] ABSTRACT

A reinforcing material based on glass fibers and which is resistant to attack by the free alkali present in the cementitious matrix which is to be reinforced by said material is produced from ordinary glass scrim by coating said scrim with three successive rubber latex coatings by dipping the scrim into said latexes, and drying the coatings between dips.

10 Claims, 4 Drawing Figures

FIG. I.

UNCOATED GLASS BUNDLE

FIRST COAT
SECOND COAT
THIRD COAT

GLASS FIBER REINFORCED CEMENTITIOUS PRODUCTS

This invention relates to a novel reinforcing material based on glass fibers which is resistant to attack by the alkali present in the cementitious matrix which is to be reinforced by said material and to the method by which it is prepared and to its use as a reinforcing material in an alkaline matrix.

The reinforcement of various materials by means of glass fibers is a highly developed art and many issued patents describe the reinforcement of elastomenic materials, including Marzocchi U.S. Pat. Nos. 3,869,306 and 3,953,648 issued Mar. 4, 1975 and Apr. 27, 1976 respectively. Also disclosed in the literature is the reinforcement of cementitious materials as described in Hill U.S. Pat. No. 4,016,995, Hill et al U.S. Pat. No. 4,101,334 and Cohen et al U.S. Pat. No. 4,119,477.

As is recognized by those skilled in the art the problems of reinforcing cementitious materials with glass fibers are somewhat different from the problems which must be solved in reinforcing synthetic resins, especially because the alkali in the cementitious materials attacks the glass fibers, as described in U.S. Pat. No. 4,119,477, and as is known in the art. One approach followed to overcome this difficulty is the use of specially formulated alkali resistant glasses. These glasses are expensive to produce. Furthermore, it has been found that even when alkali resistant glasses are utilized, the reinforcement does not last for the desired length of time, usually 5-10 years or longer because uncoated alkali resistant (AR) glass is eventually susceptible to attack by the alkali in the cement matrix. Consequently to improve the service life of the reinforcing material many coatings have been developed, as described for example, in the United States Patents noted above, but even coated glass fibers are not entirely resistant to attack by the alkali, possibly because of pinholes or other discontinuities in the protective coating.

One object of the present invention is to provide a coating of the glass fiber reinforcement material which is free from porosity or other surface discontinuities and which protects even ordinary "E" glass fibers from attack by alkali when they are embedded in a cementitious matrix.

Another object of the invention is to provide a procedure for coating glass fiber materials which produces a complete coating of the glass and which results in a reinforcement which is not adversely affected by the alkali present in cement or other cementitious compositions in which the reinforcement is embedded, even after exposure for long intervals of time.

A further object of the invention is the provision of a reinforced cementitious matrix with enhanced properties.

Still another object is to provide a procedure for applying a rubber coating to glass which does not involve the use of rubber solutions, using volatile and possibly toxic solvents.

Figure 2:
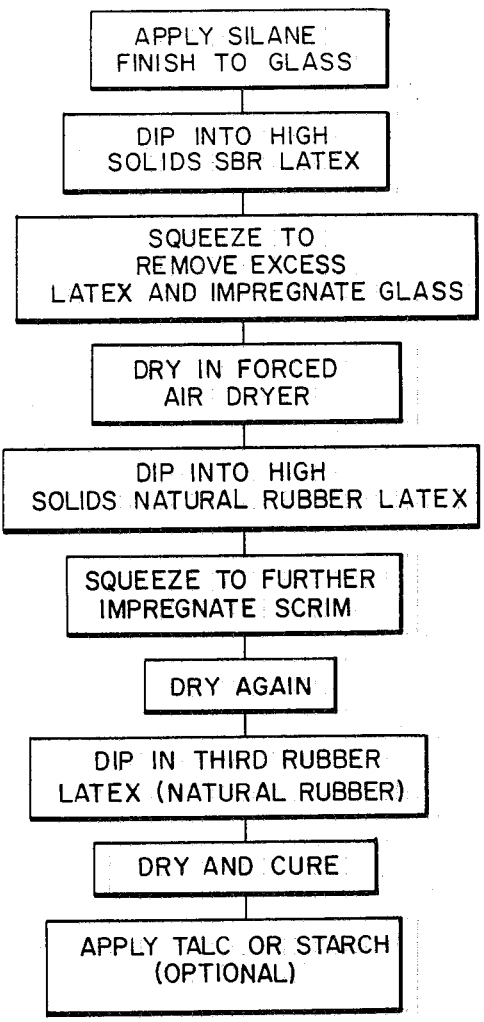
Figure 3:
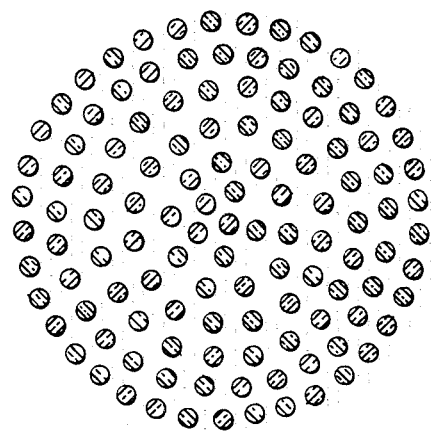
Figure 4:
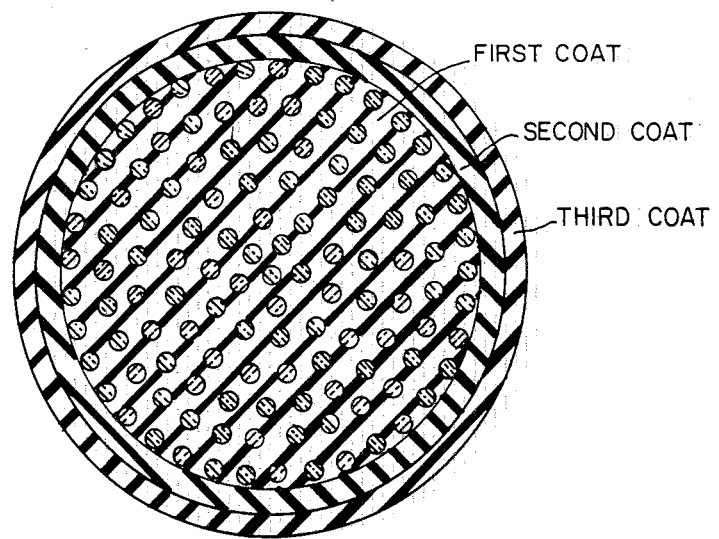

These and other objects will be pointed out and will become apparent in the description which follows taken with the drawings in which FIG. 1 is a schematic representation of one apparatus utilized in the practice of this invention; FIG. 2 is a flow sheet showing the steps in the process; FIG. 3 is a schematic view showing the uncoated glass fiber bundle and FIG. 4 is a schematic view showing the manner in which the coatings protect the fibers in the fiber bundle.

As shown schematically in FIG. 1, a web 10 of glass fibers is supplied from any suitable source such as a bolt of glass fabric and passes over an idler roll 14 to a coating apparatus 20 consisting of a pan or tank 22 containing a bath of a rubber latex 24. The web is passed under a coating roller 26 and exits the tank by being drawn upwardly between a pair of driven pinch (nip) rolls 30, 32 which are resiliently pressed toward one another so as to squeeze excess latex from the web 10. Two misters 34, 35 spray a mist of water vapor onto rolls 30 and 32 in order to minimize evaporation of water from latex on the rolls and so avoid any buildup of latex 24 onto the rolls. As the web 10 continues to be pulled in an upward direction, a stream of air is blown at it by a blower 40 so as to dislodge any latex which may exist only as a thin film between the strands of the scrim, e.g., as a "window pane" like film. Thicker films on the glass fibers will not be affected by the air streaming from nozzle(s) 40.

The web advances through a roll train (not shown) in a dryer 50 and over an idler roll 52, then back through the dyyer 50 and to a second coating apparatus like that previously described and after a second dryer, to a third coating apparatus similarly arranged.

By the application of three coatings the scrim is found to be coated to such an extent that the scrim completely resists any degradation by the alkali present when it is incorporated into a cementitious matrix.

The following is a description of an actual example of the practice of this invention.

The glass fabric used was Burlington Glass Fabric Company Style #3701, finished with I-508, 3-aminopropyltriethoxysilane. Other silanes may be used but I-508 is preferred. The fabric was run at 17 ft/min. The dryers used were 30' long, had a total air displacement of 30,000 ft$^3$/min, and an impinge velocity of 83 ft/sec. With the fabric moving at 17 ft/min, the residence time in the dryers was 1¾ min. The speed is not critical. The fabric could have been run approximately twice as fast through these dryers. With a larger dryer with sufficient air velocity, the web could run at least 30 ft/min, and possibly even faster if desired.

The fabric entered the dip tank 22 containing latex, a high solids SBR rubber 24 and was fed through the two nip rollers 30, 32. One nip roller was made of rubber while the other roller was steel. The rollers were biased toward one another with a very small pressure. The rollers removed excess latex from the glass fabric and forced the latex to fully impregnate the fiberglass web. As shown schematically in FIG. 3, the latex penetrates the glass fibers which are in the form of a bundle of fibers and thereby protects the fibers from fiber/fiber abrasion, especially during the subsequent processing steps.

The build-up of a dried film of rubber on the rollers during the coating process was avoided through the use of water misters 34, 36 spraying directly onto the surface of the nip rollers 30, 32. These misters cancelled the effect of any evaporation of water out of the latex present on the roller surface. Preferably, a "catch pan" 38 is provided beneath the rollers to avoid the dilution of the latex in the dip pan by any excess water flowing from the rollers.

After exiting the rollers 30, 32, the glass scrim tends to have "window panes", or in other words, the holes in the weave are filled with a thin film of latex. To break up these window panes, a stream of air was directed across the fabric as it passed nozzles 40. The fabric then traveled directly into a forced air dryer set at a temperature maintained between 75° and 85° C. This dryer is preferably vertical in orientation, with a turn around roller 52 situated at the top. Th for two complete passes through the dryer. After exiting the fabric was directed to a second dip tank containing a high solids natural rubber latex and after passing through a second apparatus like that just described, the web was passed through a third apparatus of similar construction. The product produced by the three dips is shown in FIG. 4 and includes coatings 100 (first dip), 200 (second dip) and 300 (third dip). The dryer after the third and final dip was used for curing the rubber, and was therefore set at a higher temperature. The optimum curing temperature will depend on the speed of the web, the air velocity and volume in the dryer. For this exmaple, a curing (dryer) temperature of 120° C. was used. The curing temperature could run anywhere from 110° C. t0 175° C.

The first dip is a high solids styrene butadiene rubber (SBR) latex, such as Polysar XE-404 available commercially from Polysar Latex having an average particle size of the latex of 0.17 MM (1,700A). Other small particle size SBR latexes may be used with solids between 10% and 71%, it having been found that the higher the solids content and the finer the particle size of the latex, the better the impregnation or penetration of the latex into the spaces between the individual strands in the fiber bundles of which the yarn or woven fabric on the scrim is formed. The percent pick up depends to some extent on the solids content of the latex and is preferably between 15% and 22% by weight based on the weight of the glass. This SBR latex was found to adhere to the glass fibers very tenaciously.

The second and third dips are into baths of high solids natural rubber latex with between 45% and 55% solids. A preferred latex, available from Killian Latex Inc. which is sold as Killian 500#4 cure and contains 53% solids. The rubber deposit from the first and second dips is between 20% and 28%, and after the third dip is a total of 30% to 38% in the final product.

After the last dip of latex, a finish of talc or starch may be applied to the fabric in order to decrease the tackiness of the surface, and to lower the likelihood of "self sticking" when the coated web is rolled up.

The efficiency of the coating as protection against attack by alkali is evaluated by placing the coated scrim in an alkali mixture consisting of the following:
 0.88 grams/liter NaOH
 3.45 grams/liter KOH
 0.48 grams/liter Ca(OH)$_2$
balance water The solution was maintained at a temperature of 175° F. (79° C.) for seven days. After soaking for seven days the samples are rinsed in water, dried thoroughly and tested on an Instron Tensile Tester.

Using Burlington Style 3801 (E glass) with I-508 silane finish, a first dip of Polysar XE-404 (50% solids) and two further dips of Killian 500#4 cure (53% solids) as described in the specific example, the coated scrim having been cure dried for 15 minutes between coats and after the final dip the samples were cured at 230° F. (110° C.) for 30 minutes, the results were:

| Breaking Strength (1 inch specimens) | | |
|---|---|---|
| | No Alkali Treatment | Alkali Treated |
| "E" Glass, silane finish | 80 ± 4.8# | disintegrated |
| Rubber coated "E" Glass | 107.8 ± 7.3# | 106.5 ± 7.4# |

"E" glass is a well known commercially available ordinary borosilicate glass having the following approximate composition: 54.6% SiO$_2$, 14.0% Al$_2$O$_3$, .02% each of Na$_2$O and K$_2$O, 17.5% CaO, 5% MgO, 8% B$_2$O$_3$ and 0.4% CaF$_2$.

Having described a preferred embodiment of this invention it is not intended that it be limited except as required by the appended claims.

1. A process for producing a glass fiber reinforcment material with a coating which is free from porosity and other surface discontinuities and which protects the glass fibers from attack by alkali when they are, exposed to an alkaline environment which process comprises:
 coating a glass fiber material with a high solids small particle size SBR latex;
 removing excess latex from said material leaving a coating of SBR rubber on said material;
 drying said coated material;
 applying a second rubber coating to said coated material from a high solids natural rubber latex;
 drying the resulting double coated material;
 applying a third rubber coating to said glass material from a high solids natural rubber latex; and
 drying and curing the rubber coatings on the resulting product.

2. The product of the process of claim 1.

3. The process of claim 1 including in addition incorporating the product in a cementitious matrix.

4. The product of the process of claim 3.

5. The process of claim 1 in which the coating is by dipping in successive bat of latexes.

6. The process of claim 1 including removing excess coating by squeezing the product between rolls before drying the coated material.

7. The process of claim 1 including blowing air at said coated material before drying.

8. The process of claim 1 including spraying a mist of water on said rolls to minimize buildup of latex on said rolls.

9. The process of claim 1 wherein the latexes have a solids content between 10% and 71%.

10. The process of claim 1 wherein the first and second coatings comprise 20–28% and after the third coating there is 30–38% rubber on the final product.

* * * * *